United States Patent
Rassool

(10) Patent No.: US 11,544,827 B2
(45) Date of Patent: Jan. 3, 2023

(54) HUE-BASED VIDEO ENHANCEMENT AND RENDERING

(71) Applicant: RealNetworks, Inc., Seattle, WA (US)

(72) Inventor: Reza Rassool, Seattle, WA (US)

(73) Assignee: RealNetworks, Inc., Seattle, WA (US)

(*) Notice: Subject to any disclaimer, the term of this patent is extended or adjusted under 35 U.S.C. 154(b) by 46 days.

(21) Appl. No.: 17/245,840

(22) Filed: Apr. 30, 2021

(65) Prior Publication Data

US 2022/0351343 A1    Nov. 3, 2022

(51) Int. Cl.
  *G06T 5/00* (2006.01)
  *H04N 9/64* (2006.01)
  *G06T 5/20* (2006.01)

(52) U.S. Cl.
  CPC .............. *G06T 5/009* (2013.01); *G06T 5/002* (2013.01); *G06T 5/20* (2013.01); *H04N 9/643* (2013.01); *H04N 9/646* (2013.01); *G06T 2207/20208* (2013.01)

(58) Field of Classification Search
  CPC ........... G06T 5/009; G06T 5/002; G06T 5/20; G06T 2207/20208; H04N 9/643; H04N 9/646
  See application file for complete search history.

(56) References Cited

U.S. PATENT DOCUMENTS

| | | | | |
|---|---|---|---|---|
| 8,077,184 B1* | 12/2011 | Srinivasan | .............. | G09G 5/02 345/589 |
| 9,911,181 B2* | 3/2018 | Pouli | ........................ | H04N 5/57 |
| 10,062,152 B2* | 8/2018 | Choudhury | .......... | G06V 10/507 |
| 10,148,871 B2* | 12/2018 | Thumpudi | .............. | H04N 5/217 |
| 10,572,984 B2* | 2/2020 | Jolly | ...................... | H04N 19/17 |
| 2011/0134328 A1* | 6/2011 | Tomioka | .................. | G06T 1/00 348/E9.037 |
| 2012/0201456 A1* | 8/2012 | El-Mahdy | ............ | H04N 5/2351 382/167 |
| 2015/0178950 A1* | 6/2015 | Kakinuma | ........... | H04N 1/6075 382/165 |
| 2015/0249810 A1* | 9/2015 | Sasaki | ....................... | G06T 7/11 345/589 |
| 2016/0323481 A1* | 11/2016 | Kakinuma | ........... | H04N 1/6002 |

OTHER PUBLICATIONS

Kinoshita, Yuma, and Hitoshi Kiya. "Hue-correction scheme considering CIEDE2000 for color-image enhancement including deep-learning-based algorithms." APSIPA Transactions on Signal and Information Processing 9 (2020). (Year: 2020).*

(Continued)

*Primary Examiner* — Andrae S Allison
(74) *Attorney, Agent, or Firm* — Seed IP Law Group LLP

(57) ABSTRACT

Embodiments are directed towards hue-based video enhancement. An example method includes processing low dynamic range (LDR) video content to generate an inverse tone map (ITM) for transforming the LDR video content to high dynamic range (HDR) video content, converting the LDR video content into Hue, Saturation and Lightness (HSY) color space to produce H-channel data, S-channel data, and Y-channel data, de-noising the H-channel data, remapping the de-noised H-channel data, the S-channel data, and the Y-channel data based on the ITM; and rendering the HDR video content based thereon.

20 Claims, 12 Drawing Sheets (5 of 12 Drawing Sheet(s) Filed in Color)

(56) References Cited

OTHER PUBLICATIONS

Kinoshita et al, Hue-Correction Scheme Based on Constant-Hue Plane for Deep-Learning-Based Color-Image Enhancement, Digital Object Identifier 10.1109/ACCESS.2020.2964823, Jan. 2020 (Year: 2020).*

Yong Huang, L. Hui and K. H. Goh, "Hue-based color saturation compensation," IEEE International Symposium on Consumer Electronics, 2004, 2004, pp. 160-164, doi: 10.1109/ISCE.2004.1375926. (Year: 2004).*

Luzardo et al., "Fully-automatic inverse tone mapping algorithm based on dynamic mid-level tone mapping," *APSIPA Transactions on Signal and Information Processing* 9(1): 1-15, 2020.

Lottes, Timothy, "Advanced Techniques and Optimization of HDR VDR Color Pipelines," in *AMD Game Developers Conference*, Advanced Micro Devices, San Francisco, USA, Mar. 14-18, 2016, pp. 1-106.

\* cited by examiner

HUE-BASED VIDEO ENHANCEMENT AND RENDERING

TECHNICAL FIELD

The present disclosure relates generally to video enhancement technologies and, more particularly, to the conversion from low dynamic range (LDR) content to high dynamic range (HDR) content using metadata instructions.

BACKGROUND

Video display technology has been continuously advancing, enabling higher resolution, increased frame rate, higher brightness, more vibrant colors, and other developments that improve user experience. However, content capturing and formatting lag behind. For example, movies are still captured, encoded, and rendered in a manner that doesn't take full advantage of the modern screen. The mismatch between the advanced video display capabilities and the outpaced legacy content presents new challenges and calls for technological solutions.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

Non-limiting and non-exhaustive embodiments are described with reference to the following drawings. In the drawings, like reference numerals refer to like parts throughout the various figures unless otherwise specified.

Figure 1:
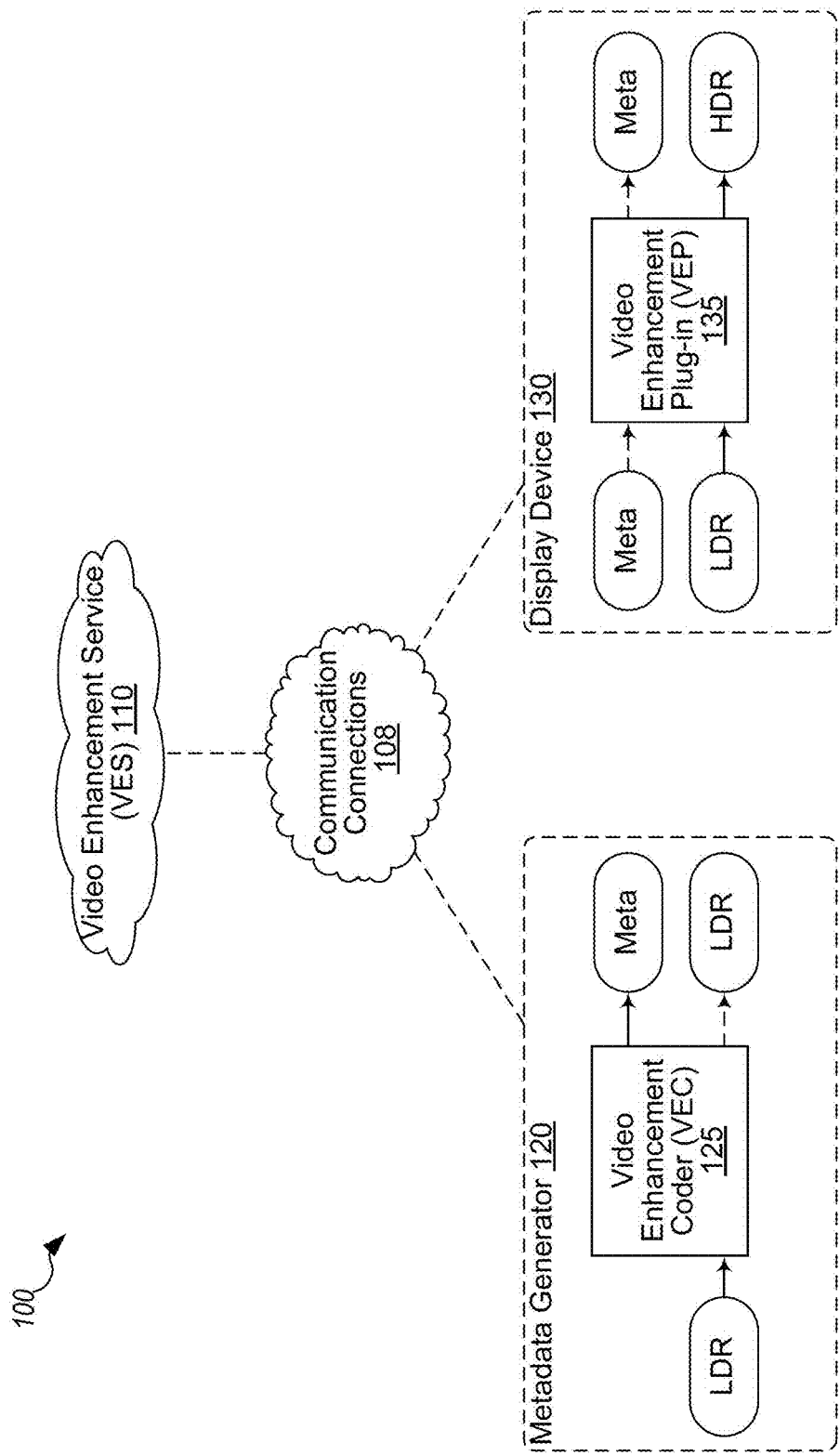
Figure 2:
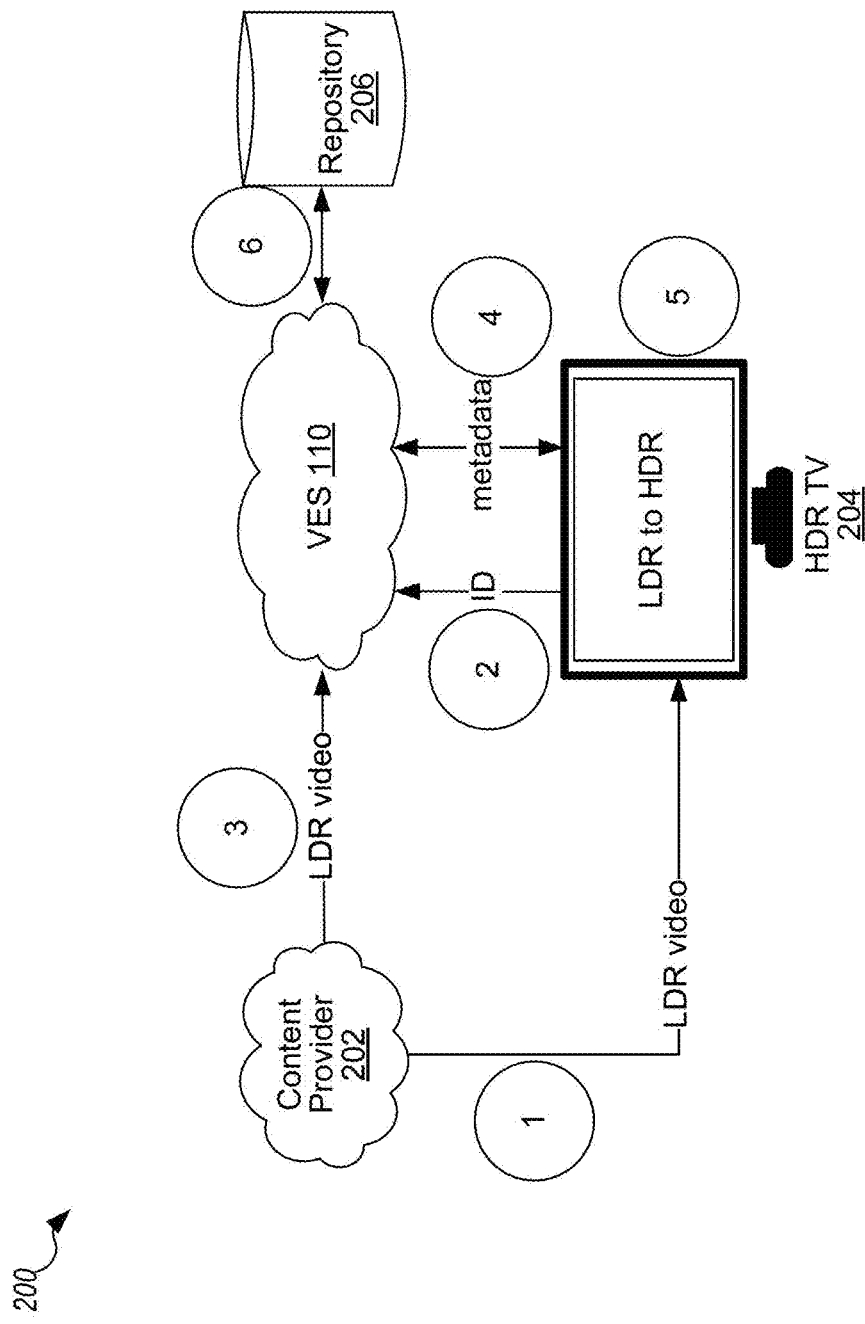
Figure 3:
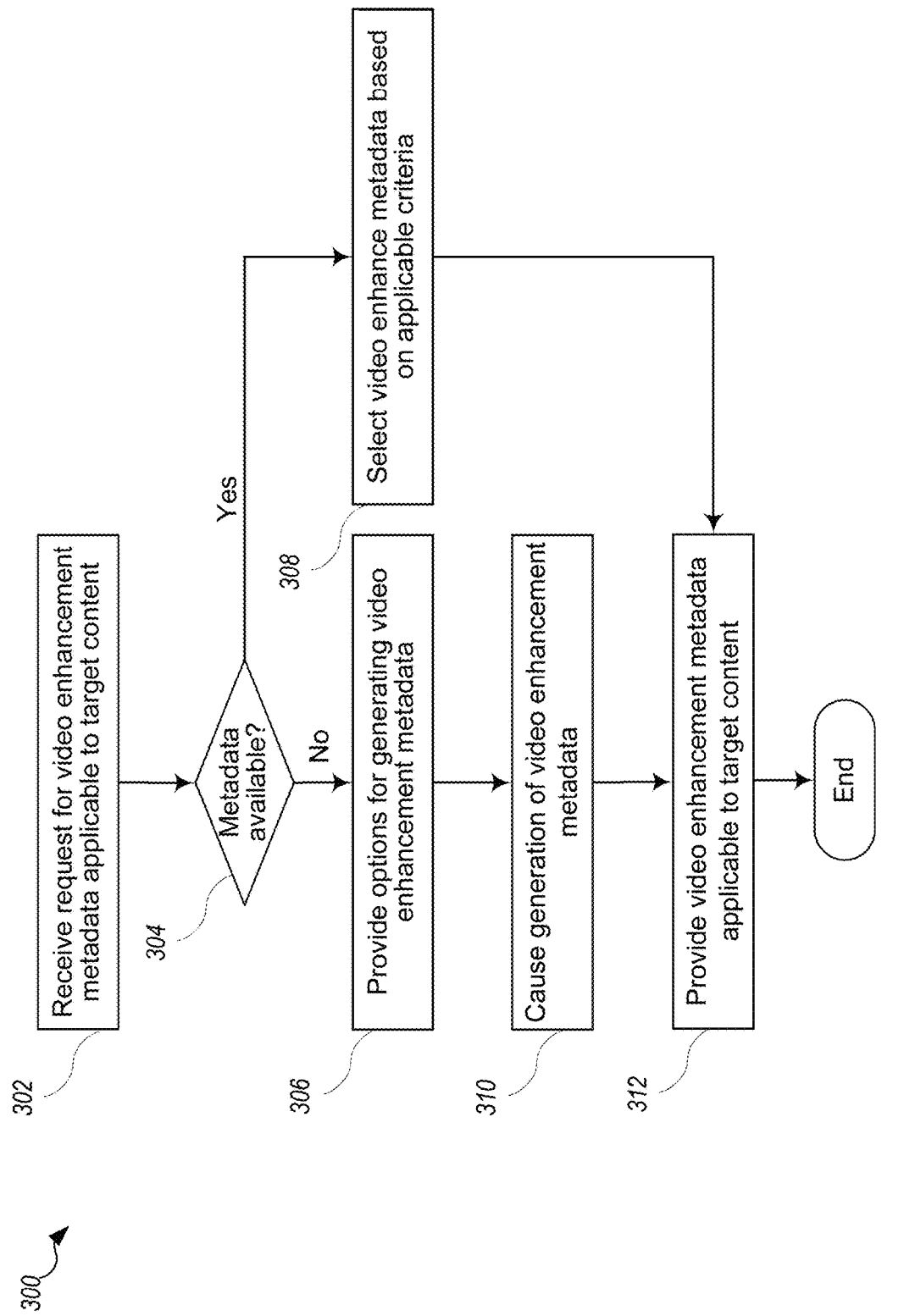
Figure 4:
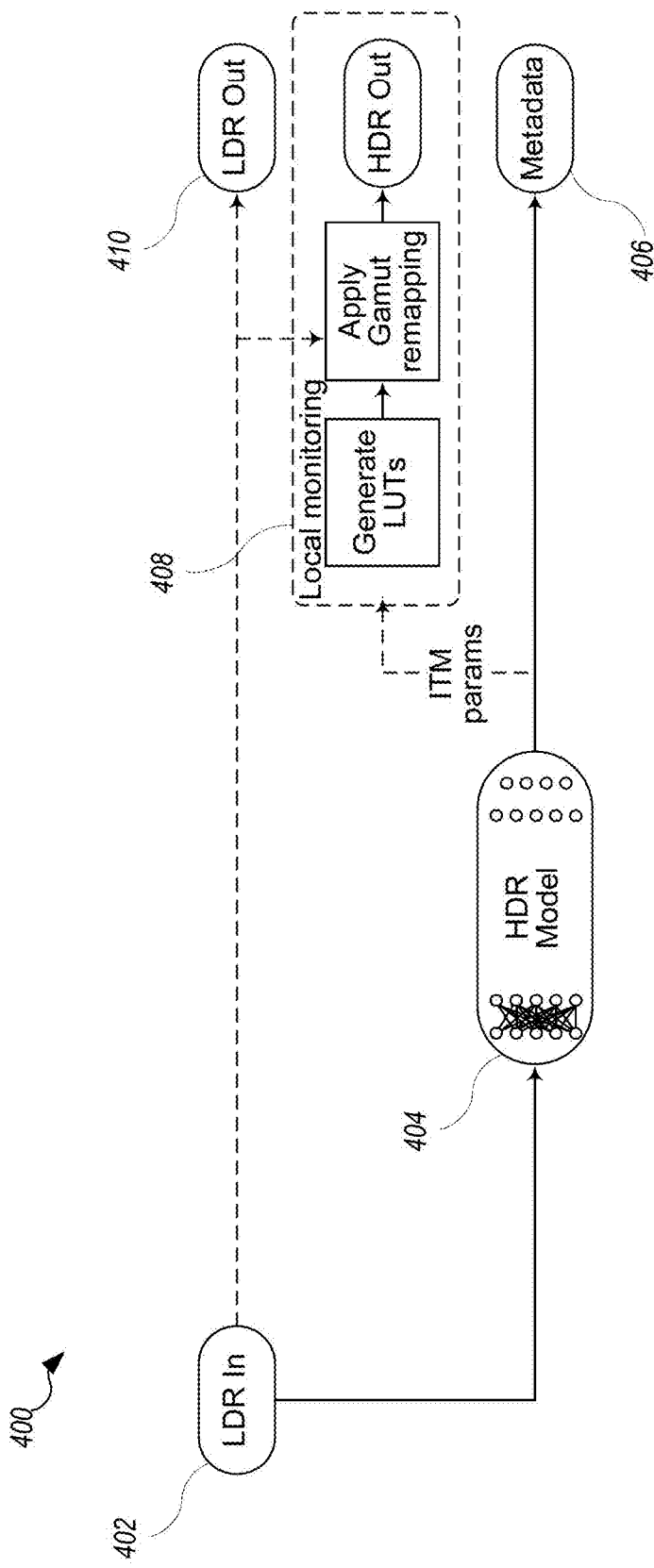
Figure 5:
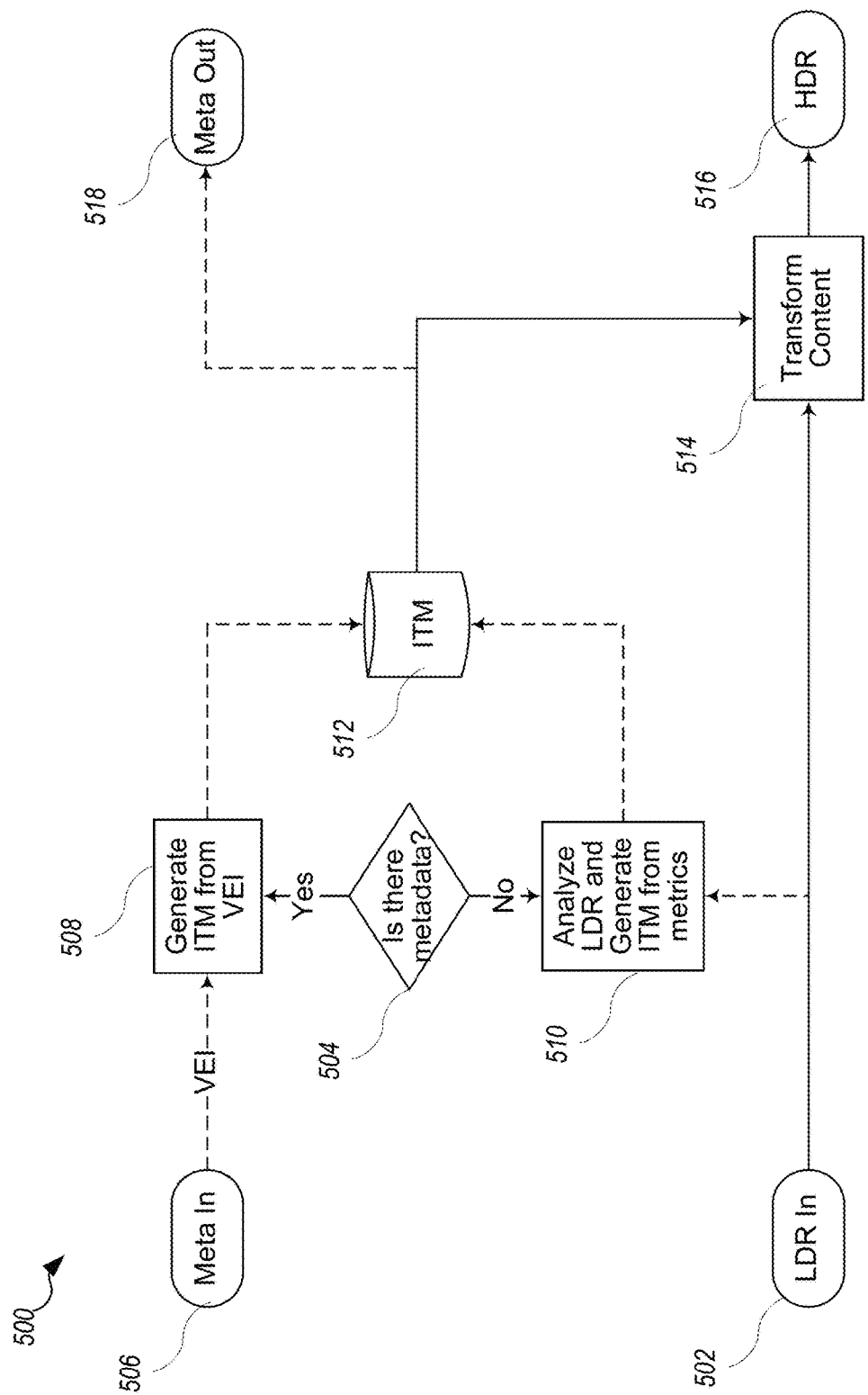
Figure 6:
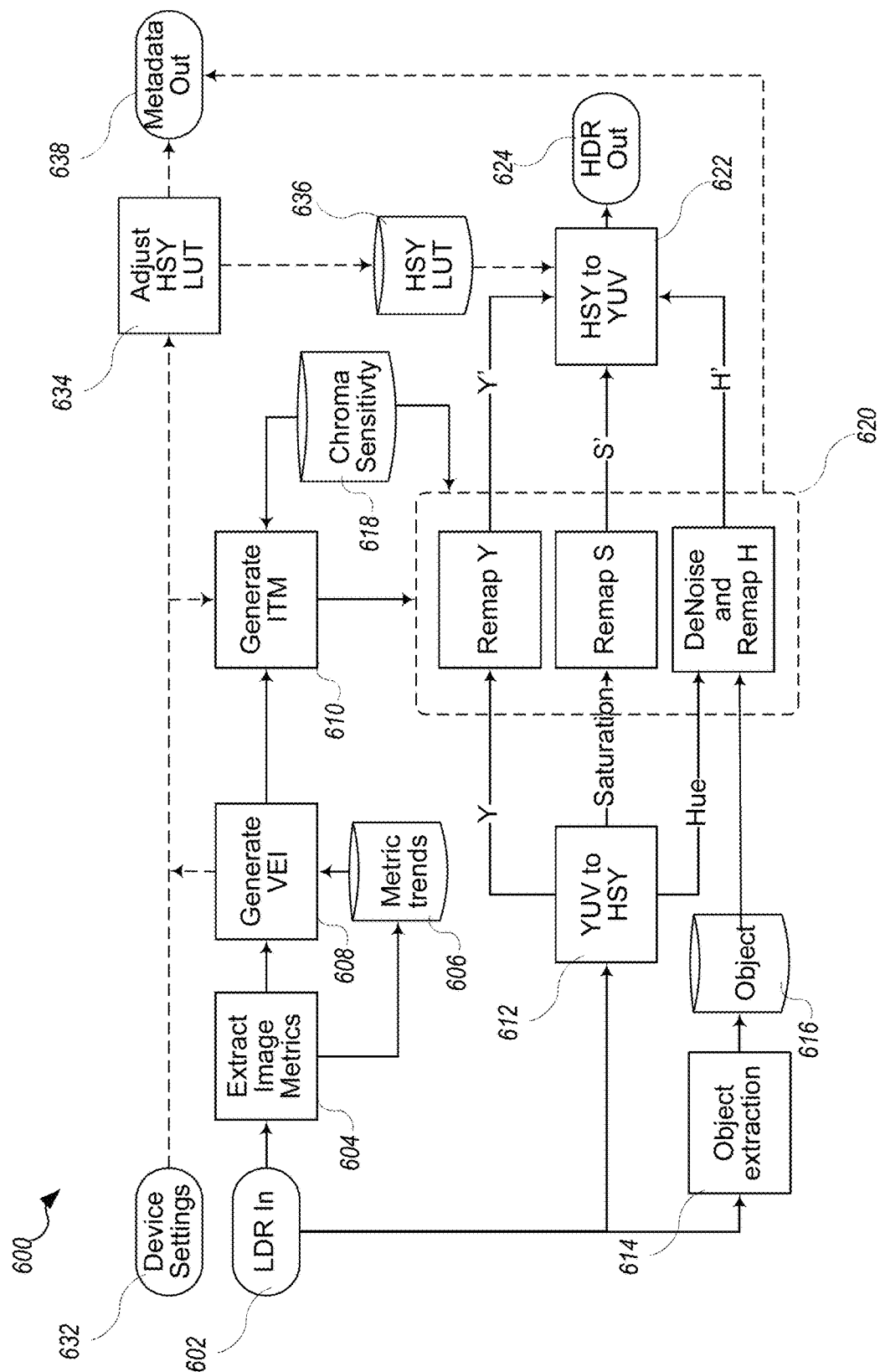
Figure 7:
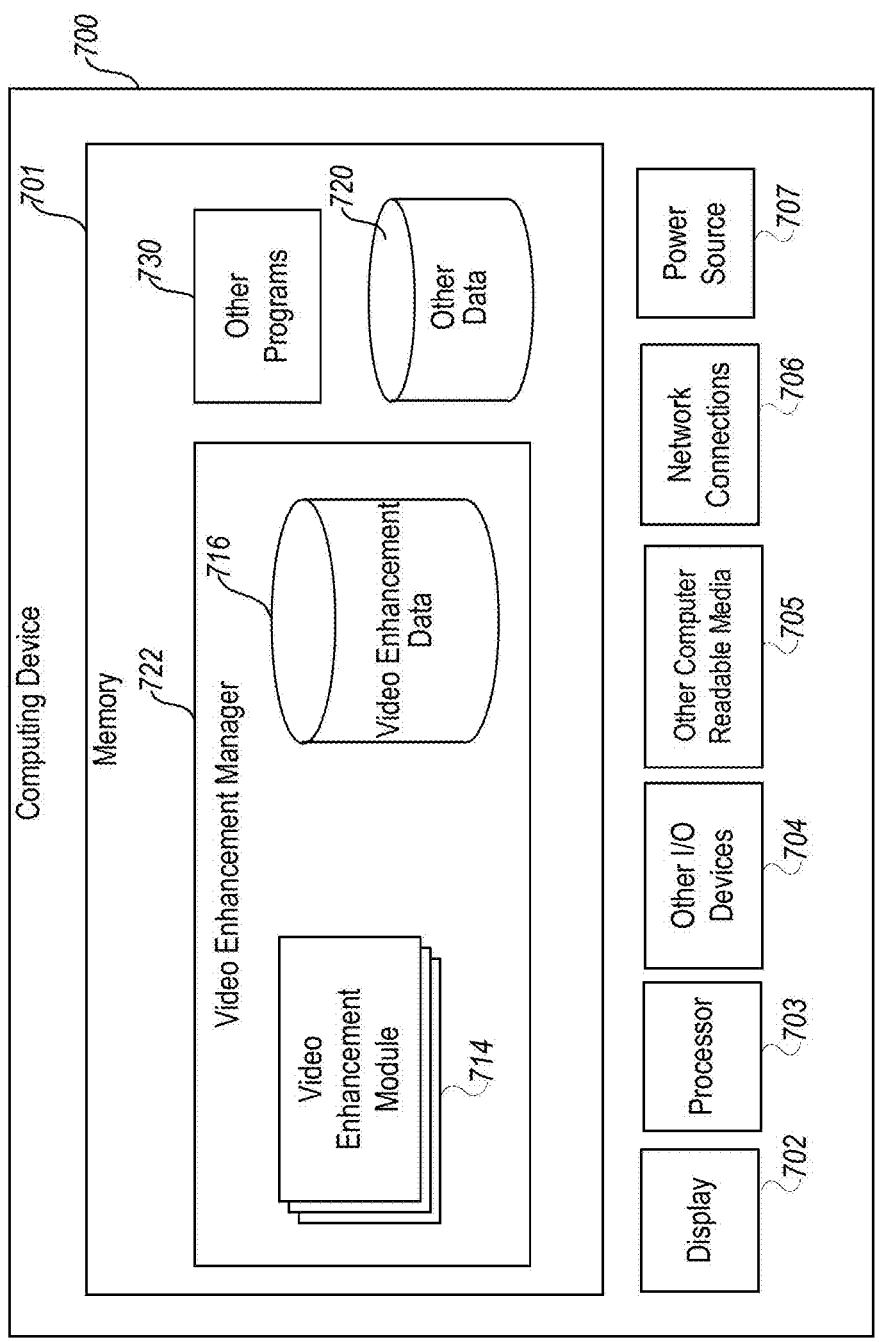
Figure 8B:
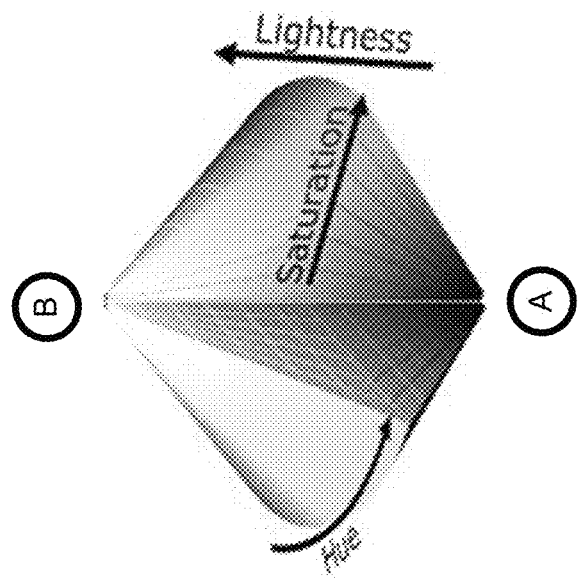
Figure 8A:
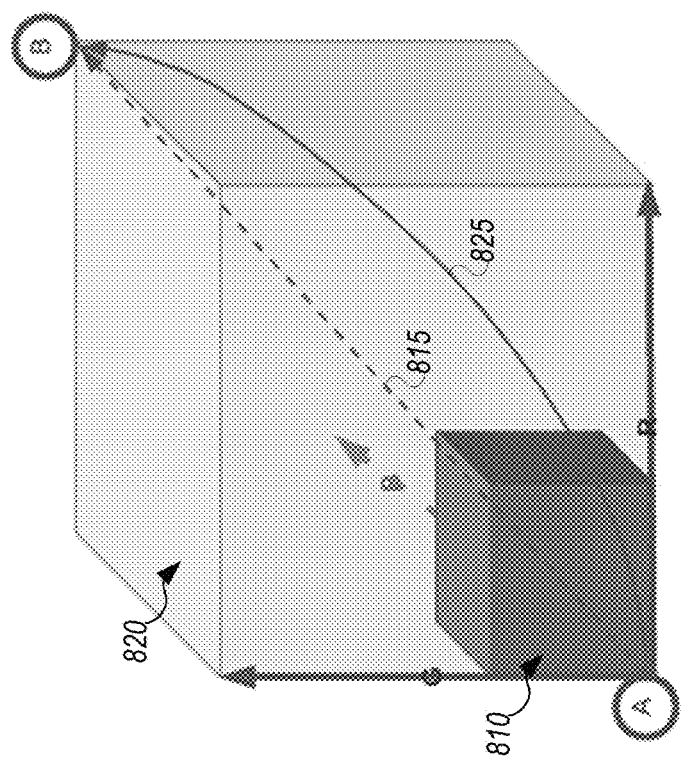
Figure 9:
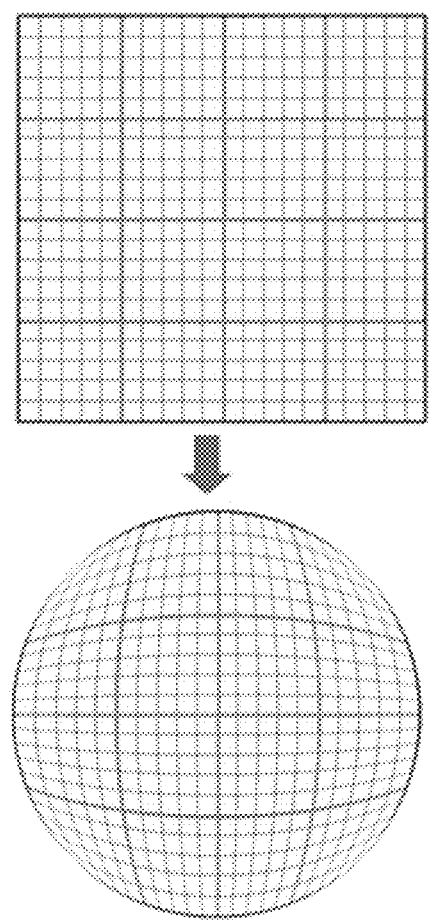
Figure 10:
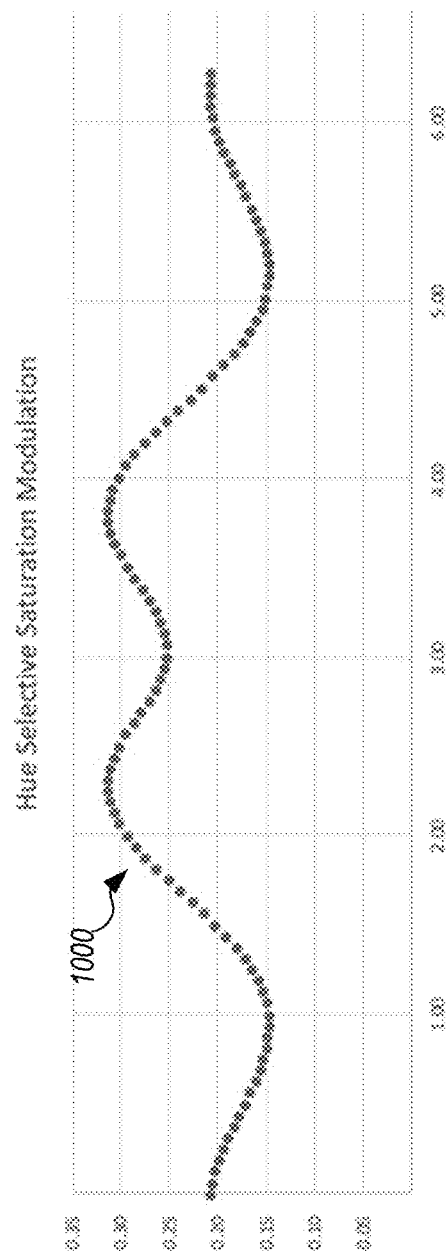
Figure 11:
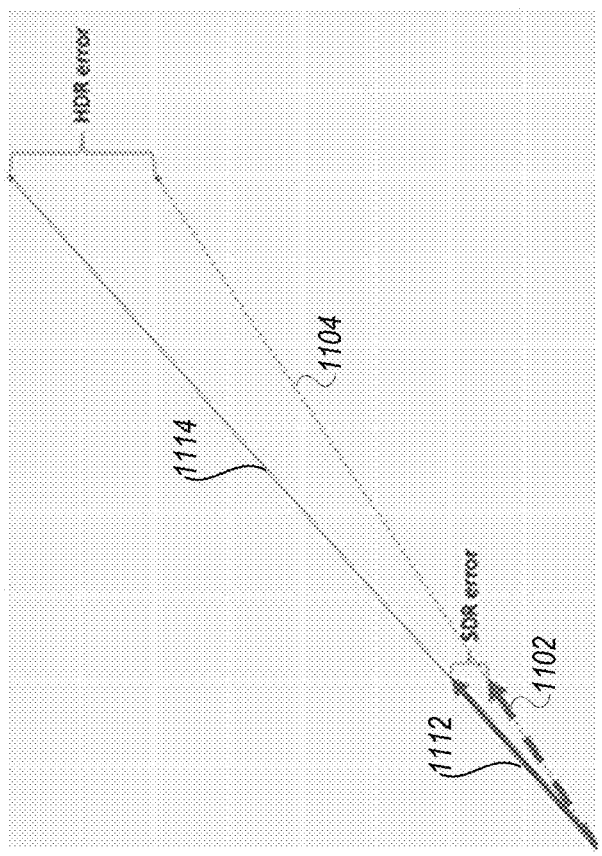
Figure 12:
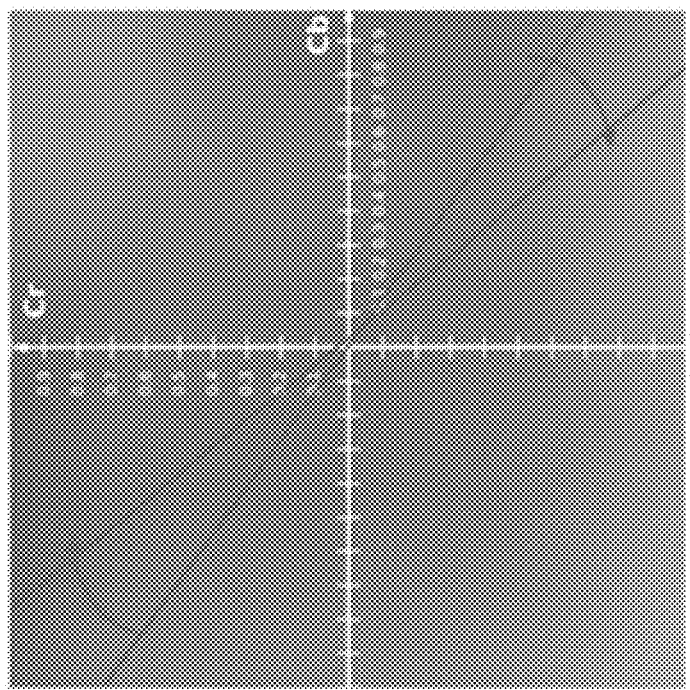

For a better understanding of the present invention, reference will be made to the following Detailed Description, which is to be read in association with the accompanying drawings:

FIG. 1 is a block diagram illustrating an example operating environment for video enhancement in accordance with some embodiments of the techniques described herein;

FIG. 2 illustrates a particular example of information flow in connection with utilizing the video enhancement technologies disclosed herein;

FIG. 3 illustrates a flow chart showing a process for facilitating video enhancement metadata in accordance with some embodiments of the presently disclosed technology;

FIG. 4 illustrates a flow diagram showing a process for generating video enhancement metadata in accordance with some embodiments of the presently disclosed technology;

FIG. 5 illustrates a flow diagram showing a process for performing video enhancement based on metadata, in accordance with some embodiments of the presently disclosed technology;

FIG. 6 illustrates a flow diagram showing a process for hue-based video enhancement, in accordance with some embodiments of the presently disclosed technology;

FIG. 7 is a block diagram illustrating elements of an example computing device utilized in accordance with some embodiments of the techniques described herein;

FIG. 8A illustrates an example Red, Green, and Glue (RGB) cube in accordance with some embodiments of the techniques described herein;

FIG. 8B illustrates an example Hue, Saturation, and Lightness (HSY) color space modeled as a bi-conic volume in accordance with some embodiments of the techniques described herein;

FIG. 9 illustrates an example of transforming chroma square to a circle by mapping coordinates while preserving angle, in accordance with some embodiments of the techniques described herein;

FIG. 10 illustrates an example curve of spectral sensitivity of the human visual system, in accordance with some embodiments of the techniques described herein;

FIG. 11 illustrates an example of chroma error in accordance with some embodiments of the techniques described herein; and FIG. 12 illustrates an example of chroma rotation in accordance with some embodiments of the techniques described herein.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances. References to the term "subset" (e.g., "a subset of the set of items"), as used herein, unless otherwise noted or contradicted by context, is to be construed as a nonempty collection comprising one or more members or instances of a set or plurality of members or instances. Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Each of the features and teachings disclosed herein may be utilized separately or in conjunction with other features and disclosure to provide systems and methods for video enhancement. Representative examples utilizing many of these additional features and teachings, both separately and in combination, are described in further detail with reference to the attached FIGS. 1-7. This detailed description is intended to teach a person of skill in the art further details for practicing aspects of the present disclosure, and is not intended to limit the scope of the claims. Therefore, combinations of features disclosed in the detailed description may not be necessary to practice the teachings in the broadest sense, and are instead disclosed merely to describe particularly representative examples of the present disclosure.

In the description below, for purposes of explanation only, specific nomenclature is set forth to provide a thorough understanding of the systems and methods for video enhancement. However, it will be apparent to one skilled in the art that these specific details are not required to practice the teachings of the current disclosure. Also, other systems and methods may also be used.

Video display technology has advanced over the past decade, providing consumers with display devices (e.g., smart TVs) of higher resolution, frame rate, brightness and significantly more vibrant colors. Thus, video display technology enables the rendering and presentation of high dynamic range (HDR) video content that is superior to low dynamic range (LDR) video content (e.g., standard dynamic range (SDR) video content) in various dimensions including resolution, frame rate, color dynamic range, combination of the same or the like.

To up-convert LDR content to HDR content, traditional methods typically rely on heavy-weight pre-processing before distributing the up-converted content to user devices, which is an inflexible process requiring a significant amount computing power and time. This approach can be cost-prohibitive for rarely viewed content libraries and impractical for live or personal content. Traditional methods also typically operate in a Cartesian coordinate color space (e.g., RGB or YUV space), resulting in undesirable amplification of chroma noise or other adverse effects. Further, traditional methods typically expand LDR to the maximum capacity of a display in an indiscriminative manner, which may distort the artistic intent of the content to a human user.

The presently disclosed technology enables a lightweight, display-side renderer capable of real-time processing for up-converting content to realize the full potential of a modern display device. The presently disclosed technology can operate in a hue-based polar coordinate color space (e.g., the Hue, Saturation and Lightness (HSY) space) to de-noise hue and remap saturation, thereby reducing the amplification of chroma noise in dark regions. The presently disclosed technology can further utilize the chromatic discrimination associated with human eyes, as a basis, to distribute gamut expansion to a modern display, which suits the human visual system and thereby improves user experience. As such, the presently disclosed technology enables rendering LDR video on HDR screens in a way that utilizes the advanced capability of the display while preserving the artistic intent of the content.

In some embodiments, the presently disclosed technology includes implementation of a video enhancement service (VES) method. The method includes receiving, from a first user device, a request for metadata applicable to instruct the first user device to transform target LDR video content to HDR video content, determining availability of candidate metadata based, at least in part, on the request, responsive to determining that no candidate metadata is available, providing options for generating the metadata applicable to instruct the first user device to transform the target LDR video content to HDR video content, causing generation of the metadata based, at least in part, on at least one of the options, and providing the generated metadata to the first user device.

In some embodiments, the HDR video content is superior to the target LDR video content in at least one of resolution, frame rate, or color dynamic range. In some embodiments, the at least one of the options includes generating the metadata by the system.

In some embodiments, the at least one of the options includes causing a second user device to generate the metadata. In some embodiments, the method further includes receiving, from a third user device, a request for metadata applicable to instruct the third user device to transform the target LDR video content to HDR video content. In some embodiments, the method further includes providing the generated metadata to the third user device.

In some embodiments, providing the generated metadata to the first user device includes causing streaming of the generated metadata to the first user device separately from a stream of the target LDR video content.

In some embodiments, the presently disclosed technology includes implementation of another VES method. The method includes receiving, from a first user device, a request for metadata applicable to instruct the first user device to enhance target video content, determining availability of candidate metadata based, at least in part, on the request, responsive to determining that no candidate metadata is available, providing options for generating the metadata applicable to instruct the first user device to enhance the target video content, causing generation of the metadata based, at least in part, on at least one of the options, and providing the generated metadata to the first user device.

In some embodiments, determining availability of candidate metadata is further based on at least one of communication capability, computational capability, video rendering capability, or display capability of the first user device. In some embodiments, determining availability of candidate metadata includes identifying a set of metadata provided by one or more second user devices. In some embodiments, determining availability of candidate metadata includes identifying a set of metadata generated in response to one or more previously received requests for metadata.

In some embodiments, causing generation of the metadata includes combining metadata applicable to different portions of the target video content. In some embodiments, causing generation of the metadata includes selecting one or more portions of metadata applicable to video content that at least partially overlap with the target video content.

In some embodiments, causing generation of the metadata includes causing one or more second user devices each to generate at least a portion of the metadata. In some embodiments, the one or more second user devices are compatible with the first user device in at least one of communication capability, computational capability, or video rendering capability, or display capability.

In some embodiments, providing the generated metadata to the first user device includes causing streaming of the generated metadata to the first user device separately from a stream of the target video content.

In some embodiments, the method further includes causing the one or more processors to receive, from a second user device, a request for metadata applicable to instruct the second user device to enhance other video content that at least partially overlaps with the target video content. In some embodiments, the method further includes providing at least a portion of the generated metadata to the second user device.

In some embodiments, determining availability of candidate metadata includes identifying a set of metadata provided by one or more second user devices.

In some embodiments, the presently disclosed technology includes implementation of a video enhancement device configured to perform actions including determining a time constraint for transforming, via the computing device, target LDR video content to HDR video content, processing the target LDR video content to generate instructions for transforming the target LDR video content to HDR video content in accordance with the time constraint, rendering the HDR video content based, at least in part, on executing the generated instructions, and producing metadata including the generated instructions for sharing with one or more other computing devices.

In some embodiments, the HDR video content is superior to the target LDR video content in at least one of resolution, frame rate, or color dynamic range. In some embodiments, the time constraint corresponds to a threshold of time delay between receiving a stream of the target LDR video content and concurrently rendering a stream of the HDR video content.

In some embodiments, processing the target LDR video content to generate instructions for transforming the target LDR video content to HDR video content in accordance with the time constraint includes at least one of selecting or configuring a machine learning model based, at least in part, on the time constraint. In some embodiments, the actions further include using the machine learning model to generate parameters for computing an inverse tone map (ITM).

In some embodiments, the actions further include determining whether metadata applicable to instruct the computing device to transform the target LDR video content to HDR video content is obtained from an external service. In some embodiments, the processing of the target LDR video content to generate instructions is performed in response to determining that the metadata is not obtained. In some embodiments, the actions further include providing the produced metadata to the external service.

In some embodiments, the presently disclosed technology includes implementation of a video enhancement method. The method includes processing target LDR video content to generate an inverse tone map (ITM) for transforming the target LDR video content to HDR video content, converting the target LDR video content into HSY color space to produce H-channel data, S-channel data, and Y-channel data of the target LDR video content, de-noising the H-channel data of the target LDR video content, remapping the de-noised H-channel data, the S-channel data, and the Y-channel data based, at least in part, on the ITM, and rendering the HDR video content based, at least in part, on the remapped de-noised H-channeled data, the remapped S-channel data, and the remapped Y-channel data.

In some embodiments, the HDR video content is superior to the target LDR video content in at least one of resolution, frame rate, or color dynamic range. In some embodiments, the remapping of the de-noised H-channel data is further based on chromatic discrimination associated with human eyes.

In some embodiments, the method further includes identifying one or more objects in the target LDR video content.

In some embodiments, the remapping of the de-noised H-channel data is further based on the identified one or more objects.

In some embodiments, rendering the HDR video content includes converting the remapped de-noised H-channeled data, the remapped S-channel data, and the remapped Y-channel data into another color space.

In some embodiments, the method further includes generating video enhancement instructions based, at least in part, on the de-noising and the remapping. In some embodiments, the method further includes sharing the generated video enhancement instructions with one or more other computing devices.

FIG. 1 is a block diagram illustrating an example operating environment 100 for video enhancement in accordance with some embodiments of the techniques described herein. The environment 100 includes one or more video enhancement services (VESs) 110, one or more metadata generators 120, and one or more display devices 130, which are communicatively connected or connectable to one another via at least some part of the communication connections 108. In some embodiments, a VES 110 includes one or more metadata generators 120 or display devices 130. In some embodiments, a metadata generator 120 includes one or more display devices 130. In some embodiments, a display device 130 includes one or more metadata generators 120.

In the depicted environment 100, the communication connections 108 can include one or more computer networks, one or more wired or wireless networks, satellite transmission media, one or more cellular networks, or some combination thereof. The communication connections 108 can include a publicly accessible network of linked networks, possibly operated by various distinct parties, such as the Internet. The communication connections 108 can include other network types, such as one or more private networks (e.g., corporate or university networks that are wholly or partially inaccessible to non-privileged users), and may include combinations thereof, such that (for example) one or more of the private networks have access to and/or from one or more of the public networks. Furthermore, the communication connections 108 can include various types of wired and/or wireless networks in various situations, including satellite transmission. In addition, the communication connections 108 can include one or more communication interfaces to individual entities in the networked environment 100, various other mobile devices, computing devices and media devices, including but not limited to, radio frequency (RF) transceivers, cellular communication interfaces and antennas, USB interfaces, ports and connections (e.g., USB Type-A, USB Type-B, USB Type-C (or USB-C), USB mini A, USB mini B, USB micro A, USB micro C), other RF transceivers (e.g., infrared transceivers, Zigbee® network connection interfaces based on the IEEE 802.15.4 specification, Z-Wave® connection interfaces, wireless Ethernet ("Wi-Fi") interfaces, short range wireless (e.g., Bluetooth®) interfaces and the like.

In various embodiments, examples of a display device 130 include, but are not limited to, one or a combination of the following: a "smart TV," "smart projector," "smart monitor," "computer," "mobile device," "gaming console," "tablet computer," "smart phone," "handheld computer," "server," or "workstation," etc. The display device(s) 130 may be any suitable computing device or electronic equipment that, e.g., is able to display or otherwise present HDR content.

The display device 130 can implement, connect to, or otherwise utilize one or more video enhancement plug-ins (VEPs) 135. The VEP 135 can process metadata associated with LDR content, to convert to and render corresponding HDR content via the display device 130. For example, the VEP 135 can compute an inverse tone map (ITM) set as specified by the metadata and remap SDR video to HDR. The metadata can be derived or otherwise obtained from a stream (e.g., from a metadata generator 120) of the LDR content having the metadata multiplexed therein, from a stream or file provided by the VES 110 in response to a query for metadata applicable to the LDR content, or from local computation in real-time of video content playback according to resource and timing constraints. In some embodiments, the locally computed metadata can be uploaded to the VES 110 for sharing with other display devices.

In various embodiments, the VES 110 can include one or more computing devices for performing the metadata management and facilitating functions described herein. Illustratively, the VES 110 can be exposed to other entities of the environment 100 by one or more application programming interfaces (APIs) (e.g., a RESTful API), can locate and identify video content, generate, request, retrieve, add, update, combine, split, or otherwise manipulate metadata for enhancing video content, and can respond to metadata inquires.

In various embodiments, the metadata generator 120 can include one or more computing devices for performing the metadata generation functions described herein. The metadata generator 120 can implement a video enhancement coder (VEC) 125 for processing LDR content based, for example, on an artificial intelligence (AI) model. In some embodiments, the metadata generator 120 can process LDR content to generate associated metadata in response to a request from the VES 110 or display device 130. Illustratively, the VEC 125 can extracting ITM parameters from LDR video content and output them as part of the metadata for enhancing the LDR content. The output metadata can be multiplexed into the transport stream of the LDR content, transmitted as a single file or set of files, or uploaded to the VES 110 to be associated with the LDR content for further sharing.

In various embodiments, individual VESs 110 and metadata generators 120 can be implemented in software and/or hardware form on one or more computing devices including a "computer," "mobile device," "tablet computer," "smart phone," "handheld computer," "server," and/or "workstation," etc.

Data communications among entities of the environment 100 can be encrypted. Related encryption and decryption may be performed as applicable according to one or more of any number of currently available or subsequently developed encryption methods, processes, standards, protocols, and/or algorithms, including but not limited to: encryption processes utilizing a public-key infrastructure (PKI), encryption processes utilizing digital certificates, the Data Encryption Standard (DES), the Advanced Encryption Standard (AES 128, AES 192, AES 256, etc.), the Common Scrambling Algorithm (CSA), encryption algorithms supporting Transport Layer Security 1.0, 1.1, and/or 1.2, encryption algorithms supporting the Extended Validation (EV) Certificate, etc.

The above description of the environment 100 and the various services, systems, networks, and devices therein is intended as a broad, non-limiting overview of an example environment in which various embodiments of the presently disclosed technology may be implemented. FIG. 1 illustrates just one example of an operating environment, and the various embodiments discussed herein are not limited to such an environment. In particular, the environment 100 may contain other devices, systems, or media not specifically described herein.

FIG. 2 illustrates a particular example of information flow 200 in connection with utilizing the video enhancement technologies disclosed herein. As illustrated, at 1, on-line LDR content is streamed from a content provider 202 (e.g., YouTube) to a user's HDR TV 204. At 2, the HDR TV 204 (e.g., via a VEP 135) queries a VES 110 with content identification information for applicable video enhancement metadata. The content identification information can include certain global identifiers (e.g., a Uniform Resource Locator (URL) or other Uniform Resource Identifier (URI) of the LDR content) or local identifiers (e.g., a unique identifier for the LDR content that is stored locally on a DVR, downloaded to tablet, etc., that the VES 110 can access). At 3, the VES 110 streams the LDR content from the content provider 202 and generates applicable video enhancement metadata (e.g., via an integrated or connected VEC 125). In some embodiments, the metadata generation can run ahead of the user stream by utilizing the computing resources available to the VES 110. At 4, the VES 110 sends the metadata to the HDR TV 204 for local processing to up-convert the LDR content. At 5, the user watches HDR video up-converted from LDR. At 6, the VES 110 stores the metadata in a repository 206, e.g., to serve subsequent requests for metadata of the same content. The VES 110 can maintain a cache pre-populated with metadata applicable to a set of the most popular content. For example, the VES 110 can identify content that is popular or expected to be popular based on a quantity of access, trend of similar content, or other criteria, and pre-process the content "off-line" to generate and cache applicable metadata.

FIG. 3 illustrates a flow chart showing a process 300 for facilitating video enhancement metadata in accordance with some embodiments of the presently disclosed technology. The process 300 can be implemented by a VES 110, and in some cases, in coordination with one or more metadata generators 120 or display devices 130.

The process 300 starts at block 302, where the VES 110 receives a request for video enhancement metadata applicable to target LDR video content. The request can be received from a display device 130, which requests the metadata in order to instruct the device to transform the target LDR video content to HDR video content. The request can include identification information for the target LDR content. For example, the request can include a URL that uniquely identifies the target content on the Internet, a hash or other fingerprint that uniquely identifies the target content, a Globally unique ID corresponding to target content, combination of the same or the like.

In some embodiments, the request can indicate additional information regarding the communication capability, computational capability, video rendering capability, display capability, or the like, of the display device. In some embodiments, the request can indicate a requirement or preference for the requested metadata in size, enhancement type, origin, ratings, or the like. In some embodiments, the request can indicate a requirement or preference for receiving the metadata, e.g., via a multiplexed stream, a separate stream, or one or more files to download. In some embodiments, these additional information, requirement, or preference can be obtained separately from the request.

At block 304, the process 300 includes determining whether the requested metadata is available. The determining can be based on the information included in the request itself, and in some embodiments, also based on information obtained separately that relates to the target content, the display device, the communication between the VES and the display device, or the like. Illustratively, the VES 110 can use the target content identification information to search a database (e.g., Repository 206) that stores available metadata indexed by identification information of their associated content.

In some embodiments, determining availability of candidate metadata that can match the request includes identifying a set of metadata originated from one or more other display devices (e.g., of the same type or otherwise compatible with the requesting display device in at least one of communication capability, computational capability, video rendering capability, display capability, or the like). In some embodiments, determining availability of candidate metadata that can match the request includes identifying a set of metadata generated in response to one or more previously received requests (e.g., requests that are the same as or similar to the current respect). For example, metadata may have been generated in response to one or more previous requests related to content that at least partially overlap with the target content, the such metadata can be candidates to match the current request. If it is determined that the requested metadata is available (e.g., a set of matching metadata is found), the process 300 proceeds to block 308.

At block 308, the process 300 includes selecting metadata from a set of available metadata based on applicable criteria. Illustratively, the VES 110 can rank or sort the matching metadata based on their compatibility with the communication capability, computational capability, video rendering capability, display capability, or the like, of the requesting display device; based on their size, enhancement type, origin, ratings, or the like; or based on other criteria. The VES 110 can select the top ranked metadata or a threshold number of top ranked metadata. The process 300 then proceeds to block 312.

Referring back to block 304, if it is determined that there is no metadata available to match the request, the process 300 proceeds to block 306, where the VES 110 provides options for generating video enhancement metadata to respond to the request. The options can include generating the requested metadata by the VES; or controlling, requesting, or otherwise causing other system(s) or device(s) (e.g., a metadata generator or display device) to generate at least a part of the requested metadata. The VES 110 can present an indication of the options to the requesting display device and receive a selection or confirmation of an option, and the process 300 can proceed to block 310. If the provided options are declined by the display device, the process 300 terminates.

At block 310, the process 300 includes causing generation of the metadata. In some embodiments, this can be achieved by combining metadata applicable to different portions of the target content. For example, the VES 110 may have identified available candidate metadata applicable to different portions of the target content, which collectively cover the entirety of the target content. The VES 110 can combine these candidate metadata to form an output for responding to the request.

In some embodiments, generation of the requested metadata can include selecting one or more portions of candidate metadata applicable to video content that at least partially overlap with the target content. In these cases, the VES 110 can perform trimming, splitting, combining, or other manipulation of the candidate metadata to form at least a part of the requested metadata.

In some embodiments, causing generation of the requested metadata includes causing one or more other systems or devices to each generate at least a respective portion of the requested metadata. The one or more other systems or devices can be selected based on their compatibility with the requesting display device in at least one of communication capability, computational capability, video rendering capability, or display capability.

At block 312, the process 300 includes providing the requested video enhancement metadata to the display device. The metadata can be multiplexed into a stream of the target LDR video content, streamed separately from a stream of the target LDR video content, or sent as a single file or multiple files. The VES 110 can provide the metadata to the display device directly, or cause one or more other systems or devices to provide at least some portion of the metadata to the display device. The process 300 ends.

FIG. 4 illustrates a flow diagram showing a process 400 for generating video enhancement metadata in accordance with some embodiments of the presently disclosed technology. The process 400 can be implemented by a metadata generator 120, and in some cases, in coordination with one or more VESs 110 or display devices 130. In some embodiments, the generated metadata can form a basis (e.g., as initial values or interim results) for another metadata generator 120, a VES 110, or display device 130 to process and generate further improved metadata applicable to the same underlying LDR content.

The process 400 starts at block 402, wherein the metadata generator 120 obtains target LDR video content for generating video enhancement metadata. At block 404, the process 400 includes processing the target content to generate ITM parameters. Illustratively, a single-pass or multi-pass AI model can be used to receive the target content as input and directly generate the ITM parameters as output.

At block 406, the process 400 includes generating video enhancement metadata including video enhancement instructions, which can instruct one or more display devices to perform video enhancement (e.g., converting from LDR to HDR) on the target LDR content or a portion thereof. In some embodiments, various types of enhancement instructions can be included in the metadata. Illustratively, enhancement in dynamic range (e.g., from SDR to HDR), enhancement in resolution (e.g., from 1080 to 4K), enhancement in frame rate (e.g., from 30 fps to 60 fps), closed caption, movie metadata (e.g., actor identities, links, or the like), social commentary, image enhancement, audio enhancement, or the like, can be included in the metadata. Accordingly, display devices can selectively use all or some types of the enhancement instructions indicated in the metadata to enhance the target content at time of playback.

In some embodiments, the process 400 includes block 408, where local monitoring by the metadata generator 120 or an associated display device is performed. Illustratively, the ITM parameters generated from block 404 are used to generate corresponding ITM(s) (e.g., in the form of look-up table(s)). Then gamut remapping can be applied to the target LDR content based on the ITM(s) to produce HDR output for local presentation. In some embodiments, the process 400 includes block 410, where the target LDR content is passed through separately, e.g., to be streamed to display device(s).

FIG. 5 illustrates a flow diagram showing a process 500 for performing video enhancement based on metadata, in accordance with some embodiments of the presently disclosed technology. The process 500 can be implemented by a display device 130, and in some cases, in coordination with one or more VESs 110 or metadata generators 120.

The process 500 starts at block 502, where the display device 130 obtains target LDR video content for enhancement. At block 504, the process 500 includes determining whether metadata applicable to transform the target content to HDR content is obtained from an external source (e.g., a VES 110 or metadata generator 120). If it is determined that the metadata is obtained, the process 500 proceeds to block 506 where the display device extracts video enhancement instructions from the obtained metadata. At block 508, the process 500 includes generating corresponding ITM(s) based on the extracted instructions.

Referring back to block 504, if it is determined that metadata is not obtained, the process 500 proceeds to block 510, where the display device analyzes the target content to generate corresponding ITM(s). In some embodiments, this is achieved by performing part of the process 400 or some variant thereof.

In some embodiments, generating the ITM(s) are performed in real-time as the target content is streamed or during the process of playback. The process 500 can include determining a time constraint (e.g., a threshold of time delay between receiving a stream of the target LDR video content and concurrently rendering a stream of the HDR video content) for enhancing the target content by the display device. The display device can process the target content to generate instructions for transforming the target LDR video content to HDR video content in accordance with the time constraint.

In some embodiments, processing the target LDR video content to generate instructions in accordance with the time constraint includes at least one of selecting or configuring a machine learning model based, at least in part, on the time constraint. For example, a reduced number of neural network layers, a simplified model structure, or a configuration to obtain interim output from the model can be established based on the time constraint. As described above with respect to the process 400, the instructions for transforming or otherwise enhancing the target content can include parameters for computing the ITM(s), which can be a direct output from the machine learning model.

Once the ITM(s) are computed, at block 512, the process 500 includes storing the ITM(s), as well as associated ITM parameters in some embodiments. At block 514, the process 500 includes transforming or otherwise enhancing the target content. This can be achieved by applying the ITM(s) on the target content. In some embodiments, other types of enhancement instructions in the metadata can be selectively applied to the target content as well. At block 516, the process 500 includes rendering the HDR video content and presenting it via the display device. In some embodiments, the process 500 further includes block 518, where metadata including the generated instructions is produced (e.g., based on the ITM(s) or ITM parameters) for sharing with external source(s). Illustratively, the metadata can be submitted to one or more VES(s) 110 for further management and manipulation. In some embodiments, the metadata can form a basis (e.g., as initial values or interim results) for a metadata generator 120, a VES 110, or display device 130 to process and generate further improved metadata applicable to the same underlying LDR content.

FIG. 6 illustrates a flow diagram showing a process 600 for hue-based video enhancement, in accordance with some embodiments of the presently disclosed technology. The process 600, or a part thereof, can be implemented by a display device 130, metadata generator 120, or VES 110.

The process 600 starts at block 602, where target LDR content is obtained. From block 602, the process 600 has at least three paths that are implemented in parallel, in partial temporal overlap, or in sequential order with one another. The first path relates to ITM generation and starts from block 604 through to block 610; the second path relates to HSY remapping and starts from block 612 though to block 622; and the third path relates to object-based hue de-noising and starts from block 614 through to block 620.

For the first path, at block 604, the process 600 includes extracting image metrics from the target LDR content. The image metrics extracted from the target content can include Ymax, Ymin, Geometric mean, Contrast, or other metrics that can be inputs into an ITM generator. The ITM can be recomputed every frame, but such dramatic changes in the ITM can lead to poor viewing experience. To preserve computational resource and to improve user experience, the ITM can be updated at scene changes. Accordingly, at block 606, image metric trends are stored and compared to the current image metrics. Based on the comparison, scene changes can be determined and the ITM can be recomputed or updated. At block 608, at least a portion of video enhancement instructions (e.g., including ITM parameters) are generated based on results from blocks 604 and 606. At block 610, the ITM is generated, for example, based on methods described in:

Luzardo, G., Aelterman, J., Luong, H., Rousseaux, S., Ochoa, D., & Philips, W. (2020). Fully-automatic inverse tone mapping algorithm based on dynamic mid-level tone mapping. APSIPA Transactions on Signal and Information Processing, 9, E7. doi:10.1017/ATSIP.2020.5, and Timothy Lottes: Advanced Techniques and Optimization of HDR Color Pipelines, in 2016 Game Developer Conf.

For the second path, at block 612, the process 600 includes converting the target LDR content into HSY color space to produce H-channel data, S-channel data, and Y-channel data. Illustratively, the target LDR content is encoded or otherwise represented in Luminance and Chroma (YUV) or direct Red, Green, and Blue (RGB) color space. FIG. 8A illustrates an RGB cube, where point A represents a Black point (R=G=B=0, Y=0), point B represents a White point (R=G=B=Max, Y=Lwmax). As an example, FIG. 8A shows a blue box 810 representing the LDR color space of the target content, and a gray box 820 representing the HDR color space for enhancement outcome. The dotted line 815 between point A and point B is the gray line transitioning from black to white. Due to the human visual system's relative sensitivity to red, green, and blue, the human-perceived gray line 825 is curved. In other words, the color gamut that human eyes perceive is shaped like a banana with end-points at A and B. Generally speaking, ITM involves transforming one such banana-shaped color space into another.

HSY is a color space modeled as a bi-conic volume as shown in FIG. 8B. The bottom point of the bi-cone maps onto point A (the Black point) of FIG. 8A, and the top point of the bi-cone maps onto point B (the White point) of FIG. 8A. The bi-cone Y-axis (luminance) therefore lies on the leading diagonal of the RGB cube. Here, Hue (H) is the angle mapping onto the perceptual frequency range of human vision, Saturation (S) is the radial distance in the chroma plane, orthogonal to the Y axis, and Y stands for the lightness or luminance.

Conversion from YUV to HSY can include:
Linearization of Y based on a particular gamma value (e.g., the Rec 709 gamma value (~2.2)) or otherwise implemented with a pre-computed lookup table (LUT), which may be customized; and Transforming chroma square to a circle by mapping coordinates while preserving angle, as illustrated in FIG. 9. Here, the transformation can include offsetting the center of the chroma to be centered on the banana-like curve line (e.g., line 825 illustrated in FIG. 8A), and converting (U, V) Cartesian coordinates to (H, S) polar coordinates.

At block 620, the process 600 includes remapping the H-channel data, S-channel data, and Y-channel data. For Y-channel data (e.g., luminance), it can be remapped using the ITM. Simple application of the ITM curve results in overexposed highlights. However, straightforward application of the ITM curve can result in overexposed highlights. Accordingly, in some embodiments, an eligibility function is computed: a pixel's eligibility for luminance expansion is based on its saturation. In accordance with the eligibility function, low saturation pixels are less eligible and high saturation pixels are also less eligible. Thresholds or decays can be used to determine the low or high saturation and their associated eligibility.

For S-channel data (e.g., saturation), because the Y-channel remapping (e.g., luminance expansion) causes a desaturation, the process 600 can include a re-saturation to compensate for this desaturation. Alternatively or in addition, saturation is remapped based on hue. For example, the saturation can be modulated in accordance with a function or LUT of hue. FIG. 10 illustrates an example curve 1000 of spectral sensitivity of the human visual system, which can be used as a basis for the hue-based remapping. As shown, the horizontal x-axis represents the hue (angle 0-2π radians), and the vertical y-axis represent the saturation modulation value (e.g., from a corresponding LUT).

As for the remapping of H-channel data (e.g., hue), it can involve the third path related to object-based hue de-noising. The human visual system has evolved to track objects in the field of view. Physical objects are made of material that humans reasonably expect to remain constant despite its variable visual appearance under changing lighting conditions. These changes affect the saturation and lightness of the object while the hue remains largely constant. Human minds lock onto hue and are very sensitive to hue changes. In some embodiments, the process 600 use objects to enhance the image(s) and better target the gamut expansion in a manner that is sensitive to human's object tracking brains.

Accordingly, at block 614, the process 600 can include extracting object(s) from the target content. Image segmentation and object extraction is a well-researched field, where applicable methods can be used to extract object boundaries from images. The object boundaries can be provided from an external source (e.g., via metadata). At block 616, the object boundaries or other object indications are stored for use by the hue de-noising process.

At block 620, the process 600 further includes de-noising and remapping the H-channel data (e.g., hue). Chroma noise is a typical problem in digital video. As illustrated in FIG. 11, the dotted blue vector 1102 corresponds to the real analog U, V value representing a pixel's chroma. When chroma is digitized to Cb, Cr, the resulting solid blue vector 1112 has a chroma error (e.g., the SDR error as shown) because the digital values must be integer values. When the vector is shorter, as with darker pixels, this chroma error caused noise is more visible. This problem is exacerbated when the vector is expanded (e.g., as in SDR to HDR up-conversion as illustrated by the two orange vectors 1104 and 1114), which leads to a significantly magnified error (e.g., the HDR error as shown).

The process 600 includes de-noising the H-channel data to at least remedy the chroma error. This can be achieved using the extracted objects. Illustratively, pixels susceptible to chroma noise (e.g., below a threshold of chroma vector magnitude) within an object are identified and their hue is de-noised using a weighted or unweighted voting algorithm. Their proper hue is derived from the hue of brighter adjacent pixels (e.g., within a proximity threshold or based on distance decay) within the boundary of the same object.

For the H-channel data (e.g., de-noised hue), it can be remapped. The Y-channel remapping (e.g., luminance expansion) can cause some extent of color shifting. This can be corrected by the H-channel data remapping. Illustratively, a selective, weighted rotation of the chroma as shown in FIG. 12 can be implemented in the HSY space. Applicable chroma sensitivity data (e.g., associated with human eyes) can be accessed or otherwise obtained at block 618 for use in this process.

At block 622, the process 600 includes converting the remapped de-noised H-channeled data, the remapped S-channel data, and the remapped Y-channel data back to a color space (e.g., YUV) for rendering HDR content output at block 624.

In some embodiments, at block 632, the process 600 includes obtaining local device settings (e.g., of a smart TV), which can lead to adjustment of HSY LUT at block 634, which will be stored at block 636 for use during conversion from the remapped HSY data. In some embodiments, generating video enhancement instructions includes generating parameters or instructions based on the de-noising, remapping, local HSY adjustment, combination of the same or the like. In some embodiments, metadata including the video enhancement instructions are generated and output at block 638. As previously described, the metadata can be shared, enhanced, split, combined, or otherwise reused by another entity.

In some embodiments, the process 600 is performed in accordance with a time constraint (e.g., to run in real-time). Illustratively, the process 600 is performed on each frame of target video content in a single frame period given certain available computing resources. The frame period can be based on frame rate. For example, typical U.S. TV content plays at 30 frames per second (fps), European content plays at 25 fps, and film content plays at 24 fps. This frame rate is independent of the display device's frame rate, which can be higher (e.g., 60 or 120 fps). The available computing resources (e.g., on a display device) can be determined as corresponding software implementation of the process 600 initializes or can be preconfigured.

The process 600 can include implementing a real-time manager that manages iterations of various functions, steps, or parts of the process in accordance with the time constraint (e.g., processing each frame within a single frame period) to improve quality. Individual functional modules can be associated with its respective run time duration. Illustratively, this can be scaled with respect to the processor speed upon which each module is deployed. With this run time map of the process, the total processing time (e.g., for each iteration including extracting and comparing metrics, generating new ITM parameters, de-noising, remapping, or the like) can be calculated. Thus, the real-time manager can control the number of iterations so that the process 600 is performed in accordance with the time constraint.

Various techniques can be implemented for performing the process 600 in accordance with the time constraint. In some embodiments, one technique to minimize processing time is to only process unique content frames. This can be achieved by tracking the timestamps of the frames of encoded target content. Alternatively or in addition, if image metrics (e.g., including color metrics) extracted from the current frame are the same as or sufficiently similar (e.g., within a threshold) to that of the previous frame, then the ITM parameters of the previous frame is reused—saving processing time and computing resources for computing new ITM parameters.

In some embodiments, the content creator's photographic intent is typically constant for an entire scene (e.g., a group of consecutive frames). Therefore, drastic ITM changes in the middle of a scene are to be avoided. As such, another technique to reduce computation is to use the same ITM parameters per scene. New ITM parameters can be computed prior to or at scene change (e.g., transitioning to the first frame of the next scene). To achieve this, various applicable techniques can be used to determine scene boundaries.

In some embodiments, techniques can be implemented to determine if an interim result (e.g., an HDR frame resulting from one or more iterations of processing) is of satisfactory quality. The determination can be based on whether certain key metrics of the image remain invariant across the transform, e.g.:

Hue Invariance—The hue of each pixel be perceptually invariant between transforms;

Saturation Envelope Invariance—The saturation envelope is the shape surface of the color volume of the HSY image. The surface boundary may be measured as the maximum, median, or average saturation. This boundary can be measured by taking a cross-section of the "banana" as described above, at key luminance points—e.g., mid-gray, highlights, lowlights;

Luminance Histogram Invariance—The shape of the energy distribution of the image be invariant across the transform.

While the transformed image can be brighter, exhibit more saturation, or have darker blacks, key aspects of the image can remain constant in accordance with expectations of the human visual system. Image metric measurements of successive interim results (e.g., HDR frames) can indicate quality gap in the key invariances. ITM parameter changes are directed towards closing the gap.

As described above, the process 600 can be a single-pass process in some embodiments; or can be a multi-pass process (e.g., iteratively run the entire process or certain combination of subparts of the process) in other embodiments. Image analysis (e.g., including metrics extraction) can be re-run on the HDR output candidate to gradually improve the quality of the output.

In some embodiments, ITM parameters can be modulated or otherwise manipulated based on image metric differentials. Illustratively, while the color space transformation is multidimensional and non-linear, if the difference in metrics between successive content frames or interim processed frames is small (e.g., below a threshold), then the new parameter set can be a linear scaling of the previous parameters, thus saving considerable processing time and computing resources.

Those skilled in the art will appreciate that the various operations depicted via FIGS. 1-6, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

FIG. 7 is a block diagram illustrating elements of an example computing device 700 utilized in accordance with some embodiments of the techniques described herein. Illustratively, the computing device 700 corresponds to a VES 110, a metadata generator 120, a display device 130, or at least a part thereof.

In some embodiments, one or more general purpose or special purpose computing systems or devices may be used to implement the computing device 700. In addition, in some embodiments, the computing device 700 may comprise one or more distinct computing systems or devices, and may span distributed locations. Furthermore, each block shown in FIG. 7 may represent one or more such blocks as appropriate to a specific embodiment or may be combined with other blocks. Also, the video enhancement manager 722 may be implemented in software, hardware, firmware, or in some combination to achieve the capabilities described herein.

As shown, the computing device 700 comprises a computer memory ("memory") 701, a display 702 (including, but not limited to a light emitting diode (LED) panel, cathode ray tube (CRT) display, liquid crystal display (LCD), touch screen display, projector, etc.), one or more processors 703 (including, but not limited to a central processing unit (CPU), graphics processing unit (GPU), neural processing unit (NPU), tensor processing unit (TPU), intelligence processing unit (IPU), vision processing unit (VPU), etc.), Input/Output ("I/O") devices 704 (e.g., keyboard, mouse, RF or infrared receiver, universal serial bus (USB) ports, High-Definition Multimedia Interface (HDMI) ports, other communication ports, and the like), other computer-readable media 705, network connections 706, a power source (or interface to a power source) 707. The video enhancement manager 722 is shown residing in memory 701. In other embodiments, some portion of the contents and some, or all, of the components of the video enhancement manager 722 may be stored on and/or transmitted over the other computer-readable media 705. The components of the computing device 700 and video enhancement manager 722 can execute on one or more processors 703 and implement applicable functions described herein. In some embodiments, the intelligent video enhancement 722 may operate as, be part of, or work in conjunction and/or cooperation with other software applications stored in memory 701 or on various other computing devices. In some embodiments, the video enhancement manager 722 also facilitates communication with peripheral devices via the I/O devices 704, or with another device or system via the network connections 706.

The one or more video enhancement modules 724 is configured to perform actions related, directly or indirectly, to video enhancement and other functions as described herein. The video enhancement module(s) 724 stores, retrieves, or otherwise accesses at least some video enhancement-related data on some portion of the video enhancement data storage 716 or other data storage internal or external to the computing device 700. In various embodiments, at least some of the video enhancement modules 724 may be implemented in software or hardware.

Other code or programs 730 (e.g., further data processing modules, a program guide manager module, a Web server, and the like), and potentially other data repositories, such as data repository 720 for storing other data, may also reside in the memory 701, and can execute on one or more processors 703. Of note, one or more of the components in FIG. 7 may or may not be present in any specific implementation. For example, some embodiments may not provide other computer readable media 705 or a display 702.

In some embodiments, the computing device 700 and video enhancement manager 722 include API(s) that provides programmatic access to add, remove, or change one or more functions of the computing device 700. In some embodiments, components/modules of the computing device 700 and video enhancement manager 722 are implemented using standard programming techniques. For example, the video enhancement manager 722 may be implemented as an executable running on the processor 703, along with one or more static or dynamic libraries. In other embodiments, the computing device 700 and video enhancement manager 722 may be implemented as instructions processed by a virtual machine that executes as one of the other programs 730. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 700 to perform the functions of the video enhancement manager 722. In some embodiments, instructions cause the processor 703 or some other processor, such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single processor computer system, or alternatively decomposed using a variety of structuring techniques known in the art, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported by a video enhancement manager 722 implementation. Also, other functions could be implemented and/or performed by each component/module, and in different orders, and by different components/modules, yet still achieve the functions of the computing device 700 and video enhancement manager 722.

In addition, programming interfaces to the data stored as part of the computing device 700 and video enhancement manager 722, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The video enhancement data storage 716 and data repository 720 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the video enhancement manager 722.

Furthermore, in some embodiments, some or all of the components of the computing device 700 and video enhancement manager 722 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. In cases where the present patent application conflicts with an application or other document incorporated herein by reference, the present application controls. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computing device, comprising:
memory that stores computer instructions; and
at least one processor that executes the computer instructions to perform actions, the actions comprising:
processing target low dynamic range (LDR) video content to generate an inverse tone map (ITM) for transforming the target LDR video content to high dynamic range (HDR) video content;
converting the target LDR video content into Hue, Saturation and Lightness (HSY) color space to produce H-channel data, S-channel data, and Y-channel data of the target LDR video content;

de-noising the H-channel data of the target LDR video content to at least remedy chroma error;

remapping the de-noised H-channel data, the S-channel data, and the Y-channel data based, at least in part, on the ITM; and rendering the HDR video content based, at least in part, on the remapped de-noised H-channel data, the remapped S-channel data, and the remapped Y-channel data.

2. The computing device of claim 1, wherein the HDR video content is superior to the target LDR video content in at least one of resolution, frame rate, or color dynamic range.

3. The computing device of claim 1, wherein the remapping of the de-noised H-channel data is further based on chromatic discrimination associated with human eyes.

4. The computing device of claim 1, wherein the actions further comprise identifying one or more objects in the target LDR video content.

5. The computing device of claim 4, wherein the remapping of the de-noised H-channel data is further based on the identified one or more objects.

6. The computing device of claim 1, wherein rendering the HDR video content comprises converting the remapped de-noised H-channel data, the remapped S-channel data, and the remapped Y-channel data into another color space.

7. The computing device of claim 1, wherein the actions further comprise generating video enhancement instructions based, at least in part, on the de-noising and the remapping.

8. The computing device of claim 7, wherein the actions further comprise sharing the generated video enhancement instructions with one or more other computing devices.

9. A method, comprising:

processing target video content to generate an inverse tone map (ITM) for enhancing the target video content;

converting the target video content into Hue, Saturation and Lightness (HSY) color space to produce H-channel data, S-channel data, and Y-channel data of the target video content;

de-noising the H-channel data of the target video content to at least remedy chroma error;

remapping the de-noised H-channel data, the S-channel data, and the Y-channel data based, at least in part, on the ITM; and rendering enhanced video content based, at least in part, on the remapped de-noised H-channel data, the remapped S-channel data, and the remapped Y-channel data.

10. The method of claim 9, wherein the remapping of the de-noised H-channel data is further based on chromatic discrimination associated with human eyes.

11. The method of claim 9, further comprising identifying one or more objects in the target video content.

12. The method of claim 11, wherein the remapping of the de-noised H-channel data is further based on the identified one or more objects.

13. The method of claim 9, wherein rendering the enhanced video content comprises converting the remapped de-noised H-channel data, the remapped S-channel data, and the remapped Y-channel data into another color space.

14. The method of claim 9, further comprising generating video enhancement instructions based, at least in part, on the de-noising and the remapping.

15. The method of claim 14, further comprising transmitting metadata including the generated video enhancement instructions to one or more computing devices.

16. A non-transitory computer-readable storage medium storing contents that, when executed by one or more processors, cause the one or more processors to:

process target video content to generate an inverse tone map (ITM) for enhancing the target video content;

convert the target video content into Hue, Saturation and Lightness (HSY) color space to produce H-channel data, S-channel data, and Y-channel data of the target video content;

de-noise the H-channel data of the target video content to at least remedy chroma error;

remap the de-noised H-channel data, the S-channel data, and the Y-channel data based, at least in part, on the ITM; and render enhanced video content based, at least in part, on the remapped de-noised H-channel data, the remapped S-channel data, and the remapped Y-channel data.

17. The computer-readable storage medium of claim 16, wherein the remapping of the de-noised H-channel data is further based on chromatic discrimination associated with human eyes.

18. The computer-readable storage medium of claim 16, wherein the contents further cause the one or more processors to identify one or more objects in the target video content.

19. The computer-readable storage medium of claim 18, wherein the remapping of the de-noised H-channel data is further based on the identified one or more objects.

20. The computer-readable storage medium of claim 16, wherein the contents further cause the one or more processors to generate video enhancement instructions based, at least in part, on the de-noising and the remapping.

* * * * *